United States Patent
Gay

(10) Patent No.: US 8,403,641 B2
(45) Date of Patent: Mar. 26, 2013

(54) WIND TURBINE BLADE TIP BRAKE APPARATUS AND METHOD

(76) Inventor: Paul Lewis Gay, Westport, MA (US)

(*) Notice: Subject to any disclaimer, the term of this patent is extended or adjusted under 35 U.S.C. 154(b) by 658 days.

(21) Appl. No.: 12/558,503

(22) Filed: Sep. 12, 2009

(65) Prior Publication Data
US 2012/0282094 A1 Nov. 8, 2012

(51) Int. Cl.
*F01D 7/02* (2006.01)
(52) U.S. Cl. ........... 416/51; 416/87; 416/89; 416/117
(58) Field of Classification Search ............... 416/1, 44, 416/47, 48, 51, 87–89, 169 R
See application file for complete search history.

(56) References Cited

U.S. PATENT DOCUMENTS

| | | | | | |
|---|---|---|---|---|---|
| 2,037,528 | A | * | 4/1936 | Miller | 416/23 |
| 2,074,149 | A | * | 3/1937 | Jacobs | 416/88 |
| 7,186,083 | B2 | * | 3/2007 | Bayly | 416/51 |
| 2002/0145090 | A1 | * | 10/2002 | Schenk, Jr. | 248/206.5 |
| 2003/0223868 | A1 | * | 12/2003 | Dawson et al. | 416/1 |
| 2009/0290981 | A1 | * | 11/2009 | Gandhi | 416/1 |

\* cited by examiner

*Primary Examiner* — Ninh H Nguyen
*Assistant Examiner* — William Grigos

(57) ABSTRACT

The invention relates to a wind turbine blade tip and actuator assembly and method for controlling the speed of a wind turbine rotor blade. The invention consists of a moveable and turnable blade tip, an actuator assembly for turning the blade tip, control rods, cables and springs for controlling the blade tip, a magnet assembly for holding the blade tip in position and a hydraulic damping cylinder for controlling the rate at which the blade tip deploys.

3 Claims, 7 Drawing Sheets

WIND TURBINE BLADE TIP BRAKE APPARATUS AND METHOD

BACKGROUND OF THE INVENTION

This invention relates to wind turbines, and in particular, to apparatus and methods for limiting the speed of a wind turbine rotor.

Wind turbines conventionally comprise a tall tower of circular or polygonal cross-section with a wind turbine, usually in an elongated nacelle, mounted at the top. The wind turbine has a large multi bladed propeller attached at one end and adapted to rotate about the horizontal axis. The propeller is connected through a system of gears within the nacelle to an electrical generator also contained within the nacelle. The nacelle is arranged to rotate about a vertical axis (yaw) into the wind. All of the parts driven by the turbine mechanically are contained within the body of the wind turbine or nacelle. Electrical power generated within the nacelle is carried down the tower and away to its destination by cables and/or rotary electrical connectors.

Many small and large wind turbines depend on the load of the generator to keep the rotor speed within the design limits of the rotor and rotor blades. Some wind turbines have safety brakes designed to stop the rotor. Prudent designers of wind turbines take into consideration the failure of one or more drive train components. Should the gearbox fail, for example, a brake on the high speed shaft of the generator would be unable to stop or slow the rotor. Should a brake fail, there may be no way to stop the turbine in a high wind.

One of the safest and surest ways to keep wind turbine rotor RPM within safe limits is to utilize some means of aerodynamic rotor speed control. One of the most common ways of accomplishing this is to turn the blades so that the blade airfoil is incapable of producing lift. Because this requires the entire blade to be turned, the method requires substantial actuating force and large and expensive bearings at the blade roots. The mechanism for turning the blades must also be failsafe and not dependent on outside sources of power, which may fail precisely at the time when needed most. This redundancy increases complexity and cost, often making it uneconomical for small turbines.

Another common method of rotor overspeed control is to only turn a small section of the blade, usually the blade tip. This method has the advantage of requiring much lower forces. Additionally, the blade root sections can be rigidly affixed to the rotor hub without the need for expensive pitch bearings. Because the outer portions of the blade have the greatest speed, turning the blade tips 90° to the apparent wind direction creates substantial drag and a large moment which is very effective in slowing the rotor. For a fixed pitch rotor, blade tip brakes are an efficient and economical means of rotor overspeed control. In practice, only the outer 10% to 15% of the blade needs to be turned.

For a constant speed wind turbine which uses a grid tied induction or synchronous generator, or a turbine wherein the rotor RPM is controlled by the load of the generator, there is no need for aerodynamic speed control during normal operation. By proper and careful design of the drive train and control system, the load of the generator can be made to keep the rotor speed within design limits. With such a design the only time aerodynamic speed control needs to be implemented is upon failure of the generator load or a failure of the drive train. In the case of a grid connected wind turbine, this can happen as a result of utility power failure. It can also happen to any wind turbine if some drive train component fails or if the brake fails. Because these events should be relatively rare, the aerodynamic speed control which is the subject of this invention need only be put into service in the event of a failure of the drive train, control system or brake.

SUMMARY OF THE INVENTION

In one aspect of the invention, a system and method of slowing a wind turbine rotor is provided. This aspect of the invention relates to using the outer portions of the blades—blade tips—as a means of slowing the rotor should a rotor overspeed occur. The invention is applicable to turbines having two or more blades.

The rotor blade which is the subject of this invention is constructed in two pieces: a root section and a blade tip. Although the length of the blade tip can be varied, in its preferred embodiment, the blade tip is 5% to 20% of the rotor radius.

The blade tip is secured to the root section of the blade by means of a short round rod. In its preferred embodiment the rod is made from carbon fiber because of its low weight and high strength. Use of other materials having a high strength to weight ratio for the rod are also envisioned. The rod is of relatively large diameter because it is subject to bending moments when the turbine is in operation, and when the blade tip is deployed.

The short rod is connected to a long rod running the length of the root section of the blade and terminating in a cable. The cable attaches to a plate in the blade hub called the magnet armature. The magnet armature is held in position by a permanent magnet. The long rod is only subject to tension forces so it can be of relatively small diameter. The preferred rod material is carbon fiber because of its low weight and high strength. Use of other materials having a high strength to weight ratio are also envisioned. A steel cable could also be used but it is less desirable because it may stretch slightly under load. This would allow the blade to move outward from the blade root and potentially decrease aerodynamic efficiency of the rotor.

As the turbine rotor turns, the blade tip is subject to centrifugal force. The force is dependant on the weight of the blade tip and the weight of the rods holding the blade tip in place. The centrifugal force is also a function of the square of the RPM of the rotor. Small increases in rotor RPM therefore cause large changes in the force acting on the blade tip.

The magnet is designed so that it holds the blade tip in position during normal operation of the turbine. If the turbine rotor exceeds a certain RPM, the force on the magnet increases to it is no longer capable of holding the blade tip in position. Once the magnet armature pulls away from the magnet, the blade tip is free to move radially outward. As the blade tip moves outward, a cam causes the blade tip to turn 90°. This presents the entire surface area of the blade tip to the apparent wind which causes sufficient drag to slow the rotor to an RPM well below normal operating RPM.

The present invention includes a weak return spring which pulls the blade tip back into position into the blade root. The spring is designed so that the blade tip will only reset when the rotor is stopped or nearly stopped. This feature prevents the blade tips from constantly deploying and resetting during high winds.

In one embodiment of the present invention, the wind turbine includes a brake which is released by mechanical, electrical, hydraulic, air or other means. It is envisioned that the brake would be remotely controllable from the ground. Application of the brake can be used to stop the rotor which will allow the blade tips to reset. The brake allows the blade tip to be reset by the system owner, either mechanically or electronically by the owner or automatically by the control system.

In one aspect of the present invention, the blade tip, where it joins the root portion of the blade is comprised of a section having a recessed area. The recessed area fits into the end of the fixed portion of the blade. The recessed area of the blade tip has an airfoil shape nearly identical to that of the tip itself, only of slightly smaller thickness and length. In the event that the cable or rod holding the blade tip in position stretches slightly, the airfoil portion of the reduced section will be presented to the apparent wind. The airfoil section will continue to allow the rotor to operate efficiently. If the tip were simply butted against the root section, a movement of the tip away from the root section would cause turbulence, decreasing blade efficiency and increasing aerodynamic noise.

In order for the blade tip to be recessed into the blade root, the tip must not twist until the base of the tip is clear of the blade root. The tip must therefore move radially outward without turning, then begin to turn only when clear of the root section. The cam which turns the blade tip has a straight section to allow the blade tip to move linearly outward a distance far enough so that the recessed portion is clear of the fixed blade before beginning to turn. In practice the straight portion of the slot is slightly longer than the length of the recess in the blade tip. This insures that the blade tip will have adequate clearance from the blade root before it begins to turn. When the blade tip returns to normal operation the tip resumes its position nested in the fixed blade root.

In another aspect of the present invention, the rods running down the blades are joined together by means of cables at the blade hub. All of the cables secure to the plate which is attracted to the magnet. Each cable is individually adjustable so that the cable/rod tension of each blade tip can be set. Because all of the blade tips are connected to a single magnet, deployment of one blade tip causes all blade tips to simultaneously deploy. This aspect of the present invention is applicable to turbines having any number of blades greater than two. The method assures that the large forces caused by the sudden deployment of a blade tip are shared equally by all blades. It also ensures that the maximum aerodynamic braking force will be applied in the event of an overspeed because all tips are deployed at the same time. The invention eliminates the possibility inherent in prior art that only a single blade tip might deploy. In this event, the rotor may be slowed enough so that the remaining tips never deploy but the RPM may still be very high because there is insufficient drag to slow the rotor to save levels.

The present invention uses a hydraulic cylinder to slow the movement of the blade tip. This prevents the blade tip from impacting the stop and causing stress or damage as a result of the impact. As the piston moves, fluid moves from one side of the piston to the other. The cylinder is designed so that the volume on each side of the piston changes in exactly the same amount as the piston moves. The piston is designed with two check valves each having different sized orifices. One check valve has a small orifice and the other pressure relief valve has a large orifice.

When the blade tips overcome the holding force of the magnet, they begin to move outward. As they move outward the piston of the hydraulic cylinder retards the movement. The force of the blade tips on the hydraulic piston forces fluid through the small orifice causing fluid to move from one side of the cylinder to the other. The size of the small orifice is designed so that the tips turn through 90° in 2 to 4 seconds. The slow rate of movement is designed to minimize shock from the blade tips hitting the maximum travel stop. The time is short enough that the overspeed of the rotor is minimized.

In another aspect of the present invention, there are weak springs which return the blade tips to their fully retracted position when the rotor is stopped and there is no centrifugal force acting on the tips. As the blade tips return, the hydraulic piston must also return to its original position. The design of the cylinder is such that upon retraction a check valve opens allowing fluid to move through a large orifice in the piston. The springs are designed to place sufficient force on the piston to open the check valve and allow hydraulic fluid to move from one side of the piston to the other.

An added benefit of the instant invention is that the damping of the hydraulic cylinder prevents the rotor from making rapid RPM changes when the blade tips are deployed. As the wind velocity changes the rotor RPM will tend to increase or decrease. As the RPM increases the blade tips will tend to further deploy. As the RPM decreases the return springs will tend to bring the blade tips back in line with the root section of the blade. The damping of the hydraulic cylinder causes these changes to occur slowly, so the system tends to be governed by the average wind speed, not by wind gusts and lulls. The result is that rotor RPM becomes decoupled from wind velocity changes producing a relatively constant RPM.

Operation of the invention is as follows. During the period of normal rotational speed, the magnet holds the magnet armature in place. The cable is pretensioned and the blade tip is held inward and fully seated in the slot in the fixed portion of the blade. If the speed of the blade exceeds a certain preset value, the centrifugal force from the weight of the blade tip and rods exceeds the holding force of the magnet. The preset value is determined by the holding force of the magnet minus the force of the return springs. The magnet armature then releases from the magnet compressing the hydraulic cylinder and the return springs. The blade tip and rod move out along the straight portion of the axial slot. Once the blade tip has moved out a sufficient distance so that the recessed area of the blade tip is clear of the blade root, the tip begins to turn as the pin travels along the spiral portion of the slot.

The hydraulic cylinder controls the rate at which the blade tip travels. Experience has shown that for a 10 kW wind turbine, 1 to 4 seconds is the preferred time for full travel. The blade tip causes aerodynamic drag and a reduction in useful blade length so the turbine rotor slows. The actual speed of the turbine rotor is determined by the centrifugal force exerted by the blade tip (minus the force of the return spring) and the torque produced by the wind acting on the fixed section of the blade. In its preferred embodiment, the return spring force is 5% to 25% of the centrifugal force. It is desirable to use the weakest possible return spring so as to detract from the centrifugal force as little as possible because this gives the lowest rotor RPM.

The spring force and blade tip weight and area are all designed so that once the blade tips have deployed, they will not reset as long as there is enough wind to cause the rotor to turn. Tests have shown that a wind of approximately 3-5 MPH is sufficient to keep the rotor turning. If the wind speed drops to zero or nearly so, the rotor will come to a stop or slow to such an extent that the centrifugal force of the blade tips is lower than the force of the return springs. Upon this occurrence the return springs will pull the blade tips back into their sockets in the blade root section. The magnet will attract the armature and the turbine will be ready for normal operation.

The instant invention depends only on tension applied to the small rod or cable to control the angle of the blade tip. Prior art located the device that turns the tip near the blade root. The rod connecting the blade tip with the rotator would be subject to torsion. This would require much larger diameter tube or rod in order to handle the rotational stress and keep the blade tip in line with the blade root. For a rotor blade to operate efficiently and without noise, the alignment between the blade tip and blade root must be kept accurate within fractions of a degree. The large tube would weigh much more than the rod or cable in the instant invention requiring much higher magnet strength and higher cost. The rod or cable in the instant invention is subject to tensile stress only. The long cable or small cable attaching the rod to the magnet armature is flexible enough in torsion to allow the blade tip to turn through an angle of 90° when the blade tip turns.

In another aspect of the invention, the single magnet is replaced by individual magnets and rate controls located at the root of each blade. A tension member consisting of a small rod or cable would keep the blade tip in place. Because this method would use separate magnets for each blade the size of each magnet would be smaller than that required for controlling a multiplicity of blade tips. This method would also have the advantage that each blade would be completely self contained. The magnet and spring forces could be adjusted in the manufacturing facility to ensure uniformity. It would not be necessary to assemble the linkage during turbine installation in the field. A third alternative is to use the second alternative but include a linkage connecting all blades.

BRIEF DESCRIPTION OF THE DRAWINGS

A full and enabling disclosure of the present invention, including the best mode thereof, to one of ordinary skill in the area, is set forth more particularly in the remainder of the specification, including reference in the accompanying figures wherein.

DETAILED DESCRIPTION OF INVENTION

Figure 1:
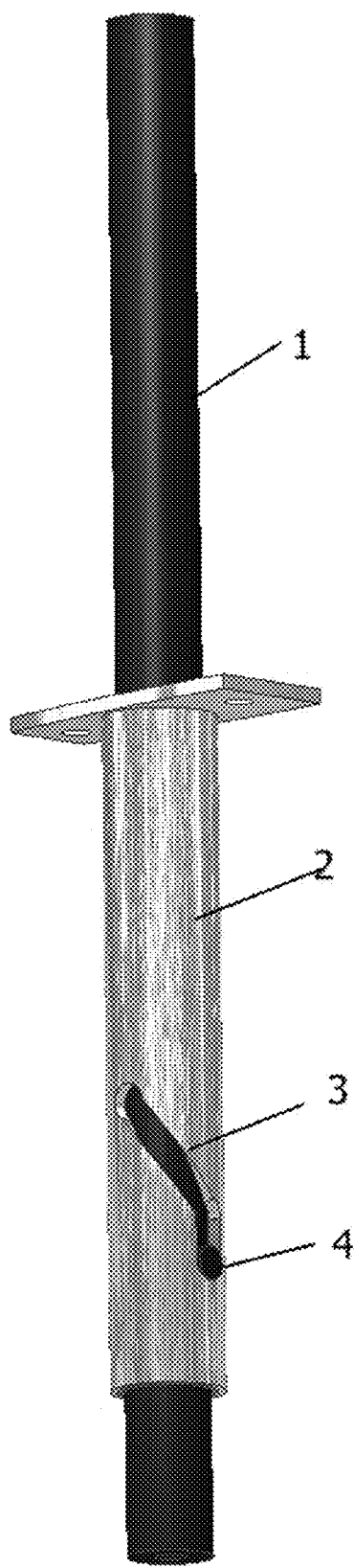
FIG. 1 shows the blade tip actuator.
Figure 2:
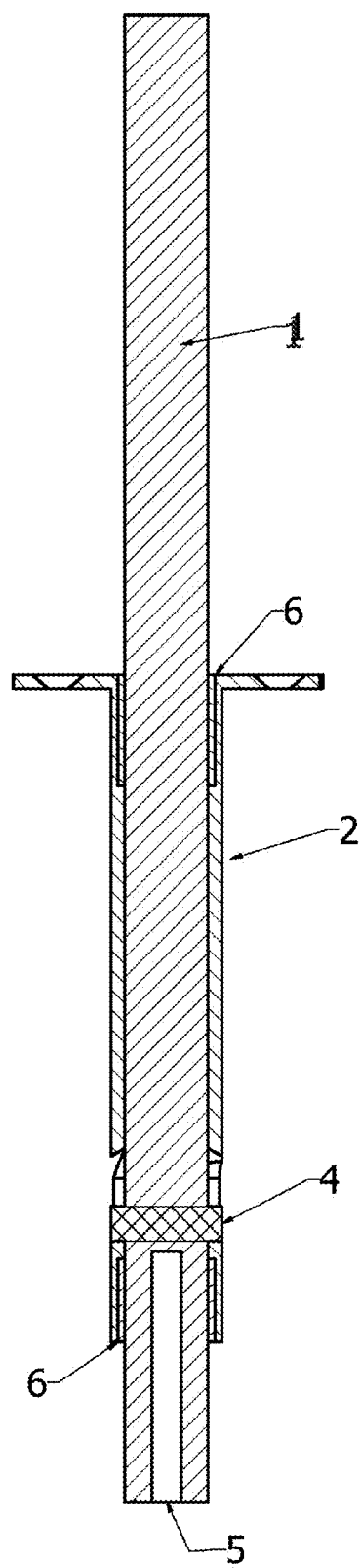
FIG. 2 shows a cross section of the blade tip actuator
Figure 3:
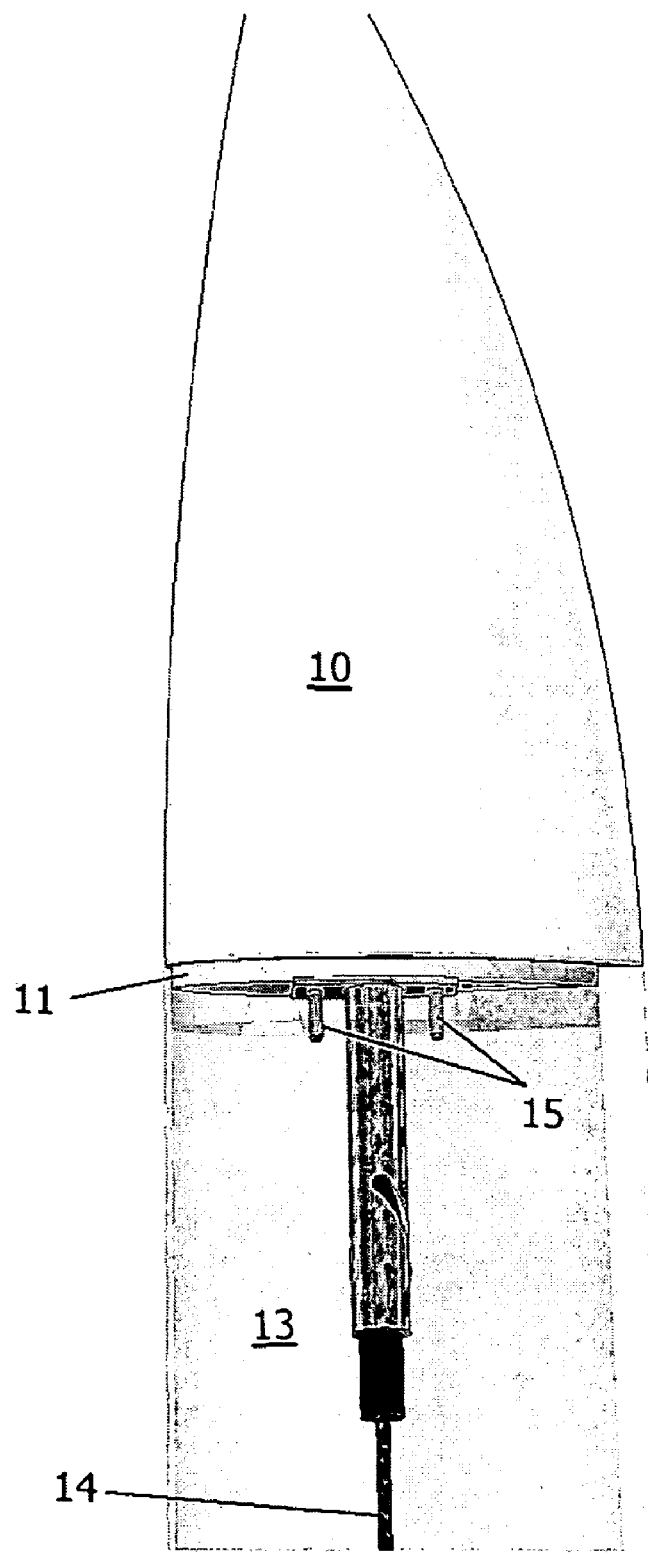
FIG. 3 shows the attachment of the blade tip actuator and blade tip to the root section of the blade.
Figure 4:
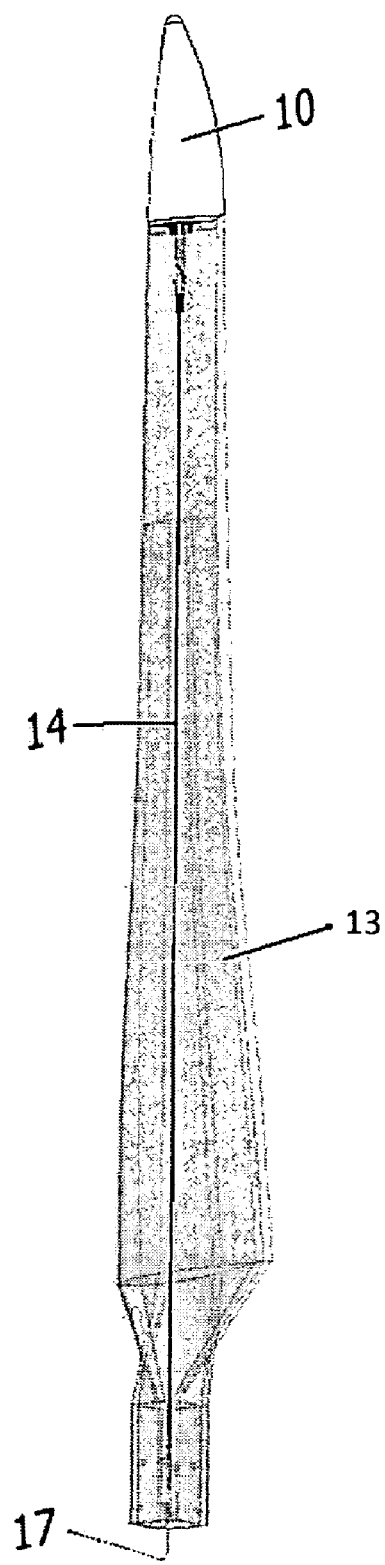
FIG. 4 shows a blade with the blade tip, actuator, long rod and cable.
Figure 5:
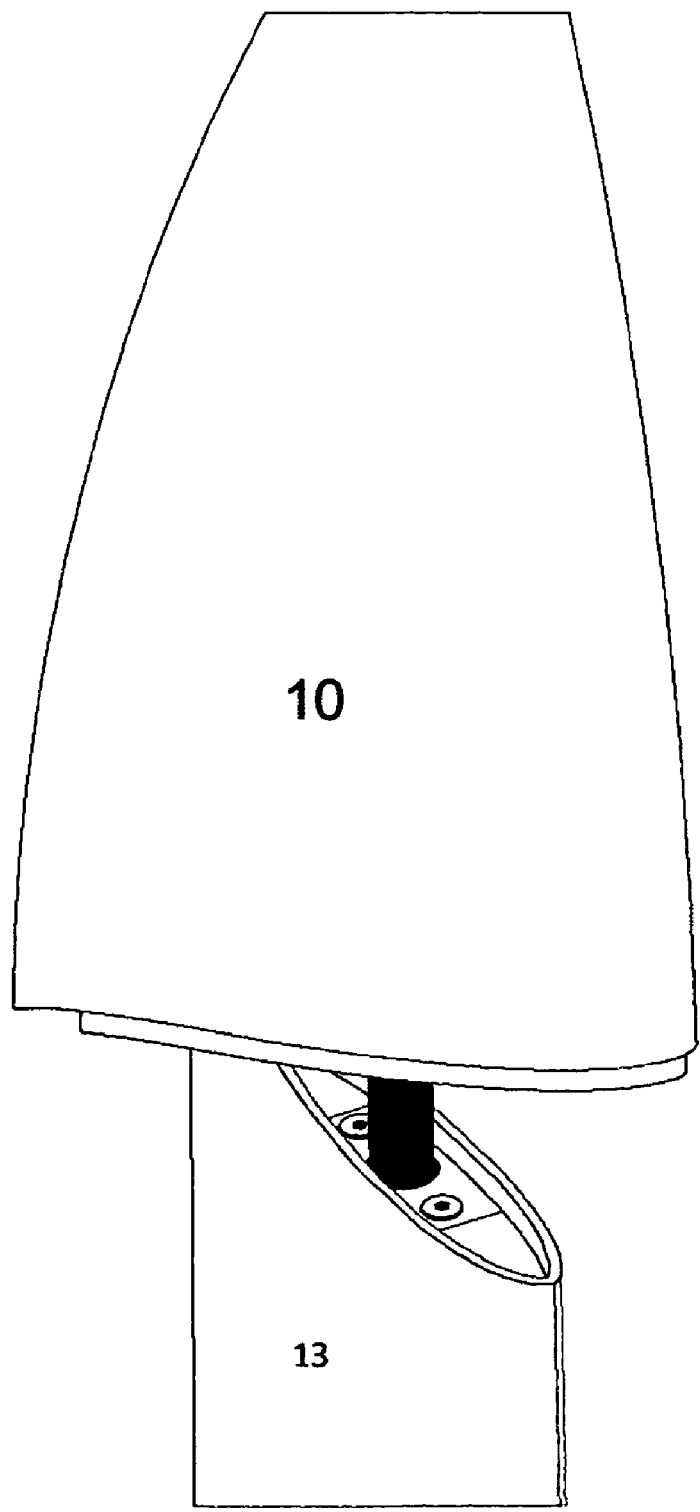
FIG. 5 shows the blade tip extended and rotated relative to the root section of the blade

Referring particularly to FIGS. 1, 2 and 3 there is shown in a first aspect of the invention, a blade tip actuator. The actuator consists in part of an outer tube 2. In the preferred embodiment, the outer tube is made from stainless steel or high strength plastic or composite. The tube must be resistant to corrosion and be of sufficient strength to withstand the loads exerted by the blade tip. The outer tube 2 has bushings 6 at each end. The bushings 6 are designed to precisely constrain the rod 1 in the outer tube 2 and to allow the rod 1 to slide and rotate relative to the outer tube. In its preferred embodiment, the bushings 6 are made from bronze, Teflon, or other metal or composite material commonly used for wear resistance, high strength and low friction. Because the bushings 6 must operate in inclement weather, they must be constructed from material which is not subject to corrosion or affected by moisture.

The outer tube contains a slot 3 which comprises a straight section and a spiral section. The straight section allows the blade tip to move outward without turning until the recessed portion of the blade tip 11 clears the blade root 13. The spiral portion of the slot causes the blade tip to turn 90° or some other predefined angle as it traverses outward along the tube.

The blade tip actuator contains a pin 4 which is pressed into the rod or otherwise securely attached to the rod. In the preferred embodiment, the rod is constructed of carbon fiber because of its high strength to weight ratio. The present invention also envisions the use of other materials for the rod such as aluminum, titanium and other materials with a high strength to weight ratio.

The pin 4 is preferably constructed from hardened stainless steel or other hard and corrosion resistant material. Hardening is essential in order to limit wear to the pin 4 because of the relatively small contact area of the pin 4 where it contacts the tube slot 3.

The pin 4 rides in the slot 3 in the outer tube. The machining tolerance of the pin and outer tube slot 3 is kept within a few thousandths in order to ensure that the blade tip 10 remains aligned with the blade root 13 during the straight portion of travel. Otherwise the blade tip may not accurately line up with the recess in the blade root which could cause binding or failure to reseat after deployment of the blade tip.

In the preferred embodiment, the blade tip actuator slides into the end of the blade root section 13 and is held in place by means of screws 15. The blade tip actuator may also be held in place by threading it into the blade root, or by screws, pins or other fasteners through the side of the blade.

The lower end of the rod 1 is bored 5 so that the long rod 14 can be attached. The long rod 14 runs nearly the entire length of the blade where it terminates in a cable near the blade root. In the preferred embodiment the long rod 14 is bonded to rod 1 using an adhesive such as epoxy. It is envisioned that the long rod 14 could also be attached to the rod 1 by threading, pining, press fitting or by other means. The long rod 14 is preferably made from carbon fiber because of its high strength to weight ratio and its low thermal coefficient of expansion. A solid rod is preferred over cable because of its lower stretch under load. If the rod were to stretch under load, the blade tip would move outward.

In the preferred embodiment the blade tip 10 is bonded to the rod 1. It is also envisioned that the rod 1 and blade tip 10 could be attached using mechanical fasteners or by threading the rod into the blade tip.

Figure 6:
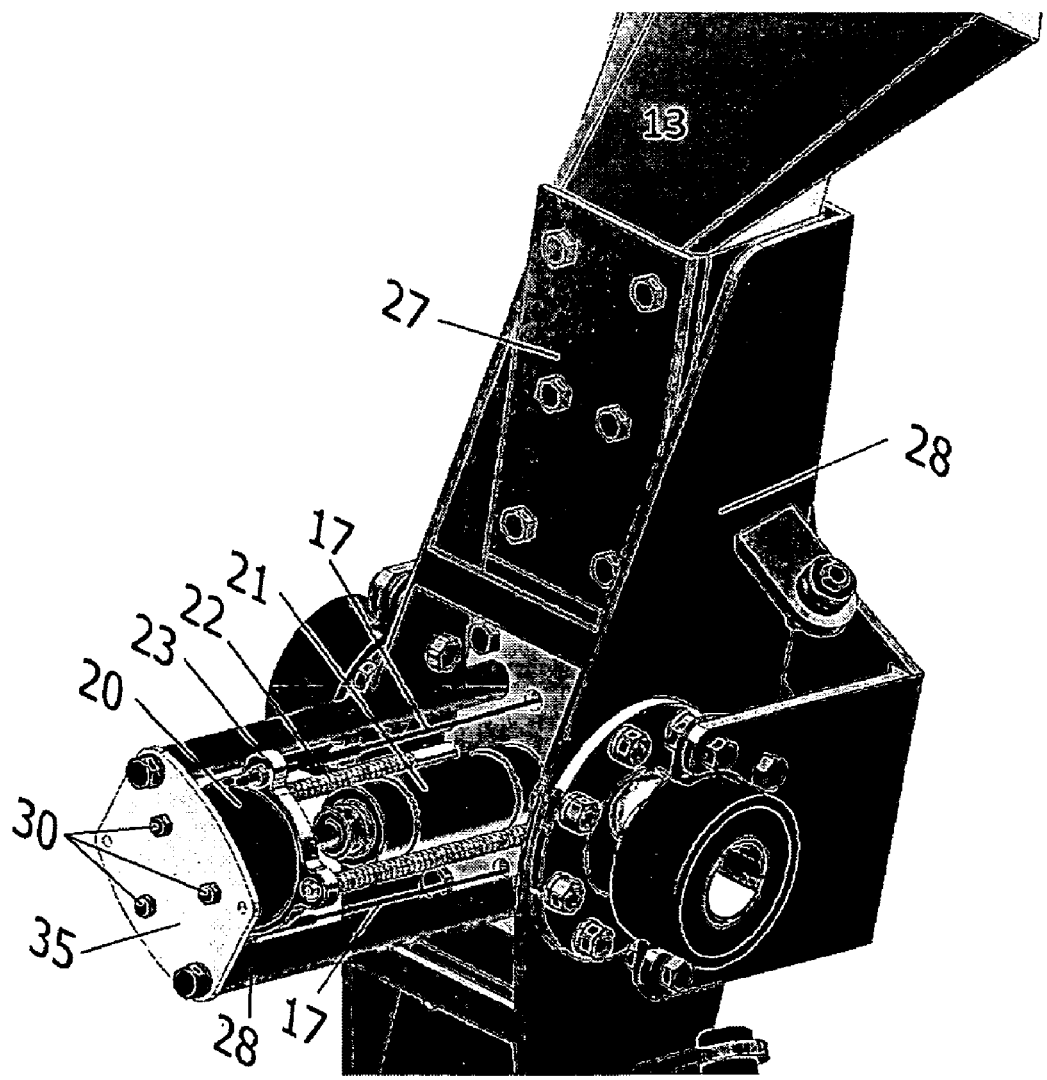
FIG. 6 shows the blade tip control mechanism.
Figure 7:
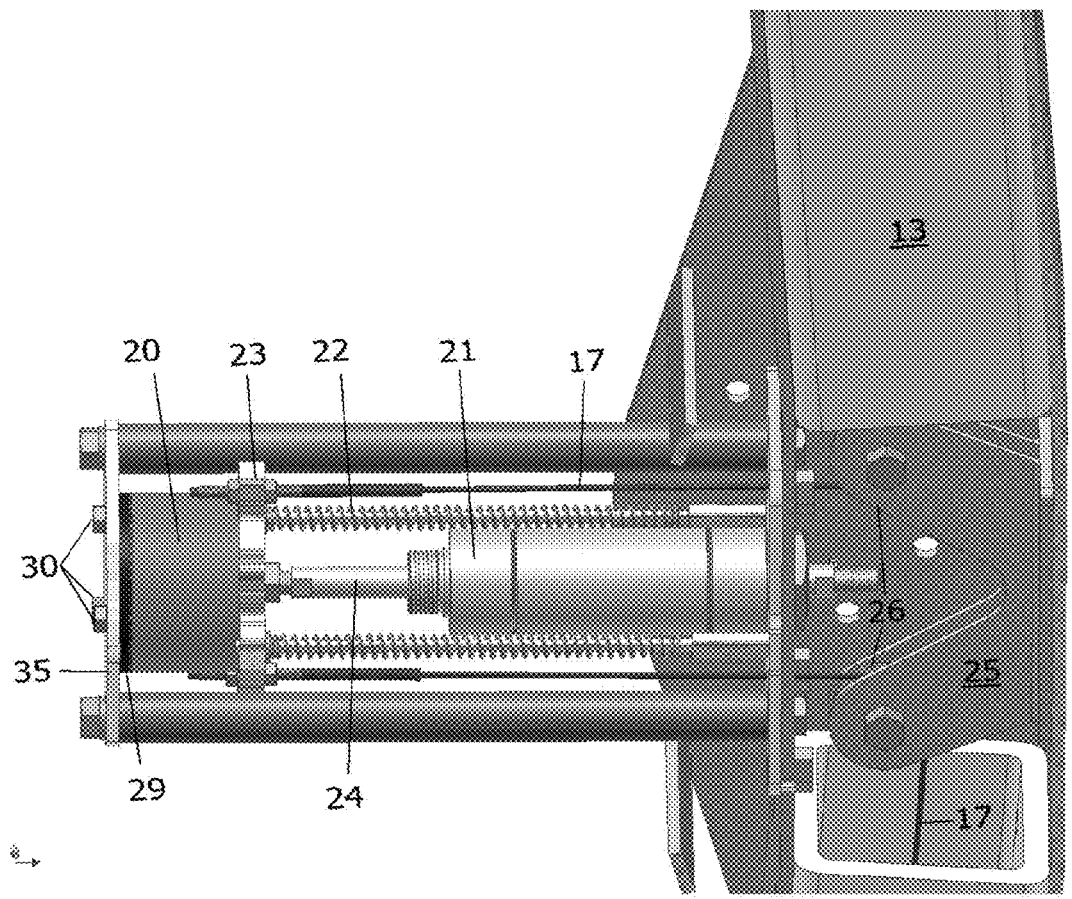
FIG. 7 shows a cross section of the blade tip control mechanism.

Referring to FIGS. 6, 7 and 8 there is shown another aspect of the invention, a blade tip control mechanism. The figures show the relationship between the parts with the blade tips in their normal fully seated position. The mechanism consists in part of cables 17 connecting to the blade tips, a magnet assembly 20, a magnet armature 23, a hydraulic damping cylinder 21 and return springs 22.

The blade tip control mechanism is attached to the blade hub 27. The magnet assembly 20 is rigidly mounted to the blade hub 27 by means of support members 28. The magnet armature 23 is attached to hydraulic piston rod 24. Cables 17 attach to long rods 14 which pull the blade tips 10 into their seat 11 in the blade roots 13. Cables 17 pass over sheaves 26 in the sheave support mechanism 25. The sheave support mechanism is rigidly mounted to the blade hub 28.

In the preferred embodiment, the magnet assembly 20 is made from neodymium. This material is preferred because of its high magnetic force. The invention also envisions use of other magnetic materials such as samarium cobalt, ceramic, etc. In practice it has been found that inserting the magnet 34 into a steel cup 32 and leaving a small air gap around the magnet increases the efficiency of the magnet. In the present invention, the steel cup is slightly longer than the magnet so that the rim of the cup 33 extends beyond the magnet. The amount of pull exerted by the magnet can easily be modified by machining the length of the cup. This changes the air gap between the magnet 34 and the armature 23.

The hydraulic damper cylinder 21 is rigidly mounted to the blade hub 27. The cylinder rod 24 is held concentric with and guided by the cylinder 21. The holding power of a magnet is highly dependant on there being a close tolerance fit between the magnet rim 33 and the magnet armature 23. In another aspect of the present invention a means of adjusting the parallelism between the magnet rim 33 and armature 23 is provided. There is inserted between the magnet assembly 20 and the magnet support plate 35 a magnet spacer 29 made from an elastic material such as neoprene or urethane. The resiliency of the magnet spacer 29 allows the magnet attachment screws 30 to be adjusted so that the magnet rim 33 is parallel to the armature 23. Differentially tightening the screws 30 compresses the magnet spacer 29 to different degrees allowing the plane of the magnet rim 33 to be moved.

The hydraulic damper cylinder 21 contains two holes through the piston. Each of the holes contains a check valve. One of the holes is very small, on the order of 0.03" in diameter. The check valve associated with this hole opens when the armature pulls away from the magnet. Because the hole is very small, it limits the amount of hydraulic oil that can pass from one side of the cylinder to the other in a given time. This restraint slows the movement of the piston and limits the speed at which the blade tip deploys. Considering a typical 10 kW wind turbine, the force on the piston rod caused by the centrifugal force acting on the blade tips can be on the order of 500 pounds. A very small orifice is required in order to attenuate a force of this magnitude. Blade tips on larger wind turbines would produce considerably more force requiring larger cylinders. Larger cylinders contain more oil than smaller cylinders so more oil would need to move through the orifice for a given amount of movement.

The hydraulic damper cylinder 21 contains a second hole and check valve in the piston. This hole is larger than the one previously described. The purpose of this hole is to allow the oil to return when the blade tip returns to its seated position. The only available force to reseat the blade tips is the force exerted by the blade tip return springs 22. As it is desirable to keep the blade tips deployed at low rotor RPM these springs are designed to be just strong enough to overcome the friction in the system when the rotor is at rest. In practice, the required spring force is about 10% of the blade tip centrifugal force. The low force requirement of the return springs 22 is aided by a large orifice and weak check valve spring in the cylinder piston on the return stroke side.

What is claimed is:

1. A wind turbine comprising:
a rotor with a plurality of blades which rotate about a substantially horizontal axis, wherein said rotor has a fixed blade root, a moveable blade tip and a mechanism for changing a pitch of the blade tip relative to the fixed blade root, by moving the blade tip radially outward for a distance without turning the blade tip, then turning the blade tip through an angle;
and the blade tip comprises a recessed portion where it attaches to the blade root.

2. The wind turbine of claim 1, wherein the mechanism for changing the pitch of the blade tip comprises a blade tip actuator and a blade tip control mechanism wherein if a speed of the rotor increases above a normal operating speed, the blade tip control mechanism releases the blade tip to allow a centrifugal force to act on the blade tip which then moves radially outward; when the recessed portion of the blade tip is clear of the blade root, the blade tip actuator causes the blade tip to turn through an approximate angle of 90°, creating aerodynamic drag and slowing the rotor.

3. The wind turbine of claim 1, wherein the blade tip recessed portion fits snugly into the end of the blade root, limiting an inboard travel of the blade tip recessed portion and preventing the blade tip from rotating relative to the blade root.

* * * * *